Sept. 30, 1930.   E. JANSEN   1,777,089
PIPE WRAPPING MACHINE
Filed Aug. 21, 1929
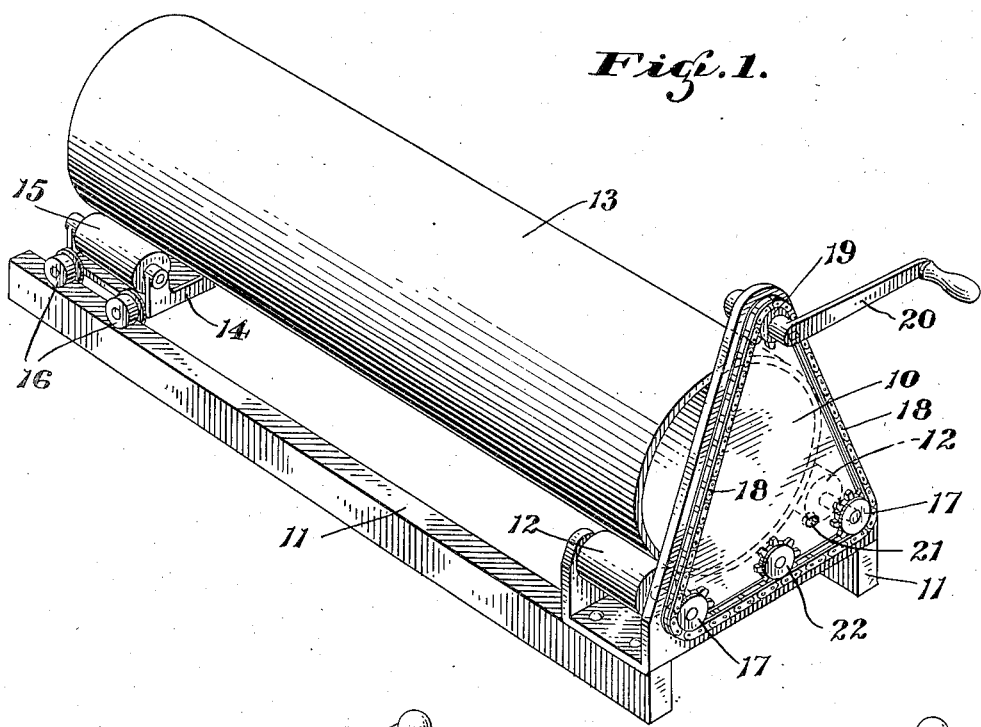
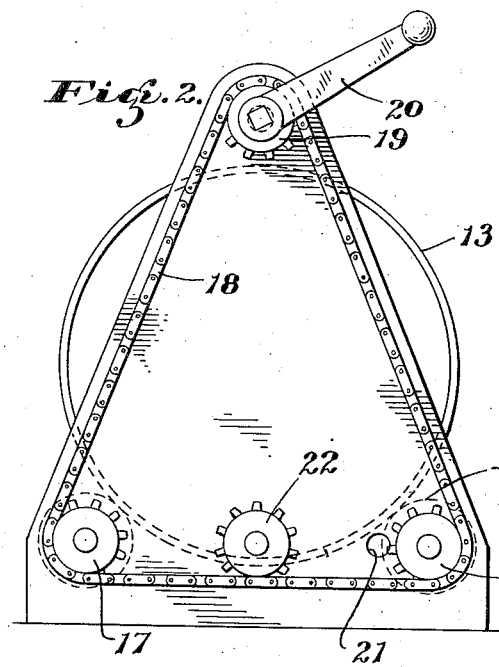
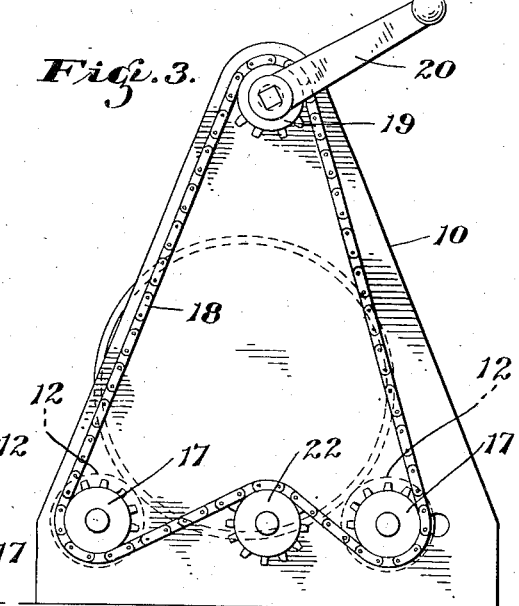
INVENTOR.
Emile Jansen.
BY Townsend, Loftus & Abbett
ATTORNEYS.

Patented Sept. 30, 1930

1,777,089

UNITED STATES PATENT OFFICE

EMILE JANSEN, OF SAN FRANCISCO, CALIFORNIA, ASSIGNOR TO GENERAL PAINT CORPORATION, OF SAN FRANCISCO, CALIFORNIA, A CORPORATION OF NEVADA

PIPE-WRAPPING MACHINE

Application filed August 21, 1929. Serial No. 387,353.

My present invention relates to a new, simple and improved apparatus for use in connection with the wrapping and coating of pipes, and more particularly to apparatus for supporting and turning the pipes during the wrapping and/or coating operations.

The object of my invention is to provide a simple, efficient and practical manually operated device for use in connection with the wrapping and coating of pipes, which is particularly well adapted to use in the field where relatively simple, light, and portable apparatus is desirable.

In the laying of long pipe lines, and particularly those involving the use of relatively light pipe of large diameter such as is customary in the oil fields, it is desirable to provide a weather-proofing or coating upon the pipe for the purpose of protecting it against rust. This coating is in most cases applied to the pipe in the factory or at some centralized point and, where this is done, the wrapping and/or coating is generally applied in an automatic manner by a suitable machine. Such a machine is illustrated and described in the patent to Wieland et al., Number 1,572,258.

It often happens, however, in making installations that individual lengths of pipe of various shapes and lengths must be wrapped at the point of assembly in the piping system and, in order to facilitate a wrapping or coating of such a length of pipe in the field, I have provided a novel apparatus which has been found to be particularly suitable for this work. In this apparatus there is provided adjustably spaced rollers upon which the pipe may be supported and a suitable means for imparting a rotary motion to a number of said rollers for the purpose of imparting a rotary motion to the pipe. One of the novel features of this apparatus is in the provision of means whereby the driving means is adapted to impart movement to the driving rollers when assembled in their different relative spacings.

For a better understanding of my invention, reference should be had to the accompanying drawing, wherein I have shown by way of illustration and not of limitation, a preferred embodiment of my invention.

In the drawing—

Fig. 1 is a perspective view showing the principal parts of my invention.

Fig. 2 is an end view of my improved apparatus showing the pipe supporting and driving rollers adjusted to support a pipe of relatively large diameter, and Fig. 3 is a view similar to Fig. 2, showing the driving rollers and driving means adjusted for the support of a pipe of relatively smaller diameter.

In Fig. 1, 10 designates what I shall term an end frame member. This end frame member 10 is supported upon the ends of a pair of rails 11 which may be of any suitable material and, in fact, may be ordinary lengths of lumber of suitable dimensions. The end member 10 carries a pair of pipe supporting rollers 12 upon which one end of the pipe to be treated may repose. The pipe in this illustration is designated by the numeral 13. At the outer end of the pipe 13 there is provided a suitable dolly 14 which carries rollers 15 similar in both diameter and spacing to the rollers 12. The dolly 14 is mounted upon suitable flanged wheels 16 and is adapted to roll along the rails 11 so that the apparatus may be adapted to pipes of different lengths.

In order to impart a rotary movement to the pipe 13 which will facilitate an application of a wrapping or coating of paint thereupon, I have provided upon the ends of the rollers 12, sprockets 17 over which a chain 18 may pass. The chain 18, after passing over the sprockets 17, extends upwardly to a central point upon the frame 10 and passes over a third sprocket 19, which is adapted to be rotated by means of a crank 20. With this arrangement, it will be seen that, as the crank 20 is turned, the chain 18 will travel around the sprockets 17 and 19 and thus cause the rollers 12 and the pipe 13 to rotate.

In order that my apparatus may be adapted to the handling of pipes 13 of different diameter, I have provided for the locating of one of the rollers 12 in a plurality of different positions. In the particular embodiment illustrated, the right hand roller 12 is adapted to be located at two distinct points in spaced relation to the left hand roller 12. The inner position of the right hand roller 12 is at the point where the shaft hole 21 occurs. In Figs. 1 and 2 of the drawing, the rollers 12 are shown as in their widest positions and, under these conditions, the chain 18 is substantially in the form of a triangle and tight about the sprockets. If, now, the spacing of the rollers 12 is changed so as to bring them closer together as would be the case where a smaller pipe is to be wrapped or coated, it will be seen that the chain 18 will of necessity become very loose upon the sprockets and, in fact, would no doubt ride up and off of the same. In order to provide for this contingency and to maintain the chain 18 tight upon the sprockets 17 and 19, I propose to mount an idling sprocket 22 at a point between the sprockets 17 so that, when the spacing of the rollers 12 is changed in such a manner, and the chain 18 is rendered loose, the chain may be passed over this idling sprocket and thus compensate for any slackness therein occasioned by a closer spacing of the rollers 12.

In the drawing the sprocket 22 is shown as mounted in a fixed position. This form of mounting, it will be understood, is perfectly satisfactory where the rollers 12 are adjustable to only two positions, as under these conditions the location of the sprocket can be very easily determined. If, on the other hand, the spacing of the rollers 12 is made adjustable to a number of different points, it is contemplated that the idling sprocket 22 will be mounted upon an adjustable support so that it can be moved to any desired point in order to take up any slack in the driving chain 18.

In Fig. 2 of the drawing, the chain 18 is shown as passing under the sprocket 22 in a straight line between the sprockets 17; and in Fig. 3, where the rollers 12 are shown as arranged in their closely spaced positions, the chain 18 is shown as passed up and over the top of the sprocket 22. In the event that the sprocket 22 is made adjustable, as above suggested, it is contemplated that the chain 18 will remain constantly in contact therewith, as shown in this figure of the drawing, and that the adjustment of the sprocket 22 will then be made by raising and lowering it with respect to the center line of the sprockets 17.

In the preceding description and drawing I have, for the purpose of simplicity, shown my improved device as adapted to manual operation. It will be readily understood, however, that where other available power may be had, such as, for instance, an electric motor or gas engine, such a means might well be used in lieu of manual operation, and in view of this fact, it will be understood that all reference to the crank 20 and manual operation is to be construed in an illustrative rather than a limiting sense.

From the above it will be seen that I have provided a new, novel, simple and efficient type of apparatus which is particularly well suited to the carrying out of the work intended in the field and at remote points where more complicated machinery is not available.

In connection with the description and illustrations of my invention, I desire to have it understood that these are for the purpose of facilitating an understanding thereof; and that it is contemplated that various changes may be made therein without departing from the spirit and scope of the invention as set forth in the accompanying claims.

Having thus described my invention, what I claim and desire to secure by Letters Patent is—

1. In a pipe-turning device, the combination of a pair of adjustably spaced rollers upon which a pipe is adapted to be supported and rotated, a driving means adapted to rotate said rollers, and means associated with said driving means adapted to render the driving means adjustable so that said rollers may be driven thereby when adjusted to their different relative spacings.

2. In a pipe-turning device, the combination of a pair of adjustably spaced rollers upon which a pipe is adapted to be supported and rotated, a sprocket connected to each roller of said pair of rollers, a third sprocket adapted to be rotated, a sprocket chain connecting each of said sprockets and adapted to rotate said spaced rollers when said third sprocket is rotated, and means adapted to co-operate with said chain to render it operative to drive said rollers in all of their positions of spacing.

3. In a pipe-turning device, the combination of a pair of spaced rails, an upwardly extending end frame member secured to one end of said rails and having a pair of spaced rollers adapted to support one end of a pipe and rotate it, an adjustable dolly having a similar pair of spaced rollers adapted to move along said rails and support the other end of the pipe as it is rotated, means for adjusting the spacing of said rollers whereby pipes of different diameters may be supported thereupon and rotated, a driving means adapted to rotate each of said rollers upon said end frame and impart a rotary movement to the pipe supported thereupon, and means co-operating with said driving means for rendering it operative to drive said rollers in all of their positions of different relative spacing.

4. In a manually operated pipe-turning device, the combination of a pair of adjustably spaced rollers upon which a pipe is adapted to be supported and rotated, a manually operated driving means adapted to rotate said rollers, and means associated with said driving means adapted to render the driving means adjustable so that said rollers may be driven thereby when adjusted to their different relative spacings.

EMILE JANSEN.